United States Patent
Sheffield et al.

(10) Patent No.: US 10,657,712 B2
(45) Date of Patent: May 19, 2020

(54) SYSTEM AND TECHNIQUES FOR AUTOMATED MESH RETOPOLOGY

(71) Applicant: Lowe's Companies, Inc., Mooresville, NC (US)

(72) Inventors: Mason E. Sheffield, Woodinville, WA (US); Oleg Alexander, Bothell, WA (US); Jonothon Frederick Douglas, Kirkland, WA (US)

(73) Assignee: LOWE'S COMPANIES, INC., Mooresville, NC (US)

( * ) Notice: Subject to any disclaimer, the term of this patent is extended or adjusted under 35 U.S.C. 154(b) by 0 days.

(21) Appl. No.: 15/990,429

(22) Filed: May 25, 2018

(65) Prior Publication Data
US 2019/0362551 A1     Nov. 28, 2019

(51) Int. Cl.
*G06T 17/20* (2006.01)
*G06F 16/583* (2019.01)
*G06N 20/00* (2019.01)
*G06F 16/28* (2019.01)

(52) U.S. Cl.
CPC ........ *G06T 17/205* (2013.01); *G06F 16/5854* (2019.01); *G06N 20/00* (2019.01); *G06F 16/289* (2019.01)

(58) Field of Classification Search
None
See application file for complete search history.

(56) References Cited

U.S. PATENT DOCUMENTS

| | | |
|---|---|---|
| 7,873,643 B2 | 1/2011 | Hadzikadic et al. |
| 8,054,460 B2 | 11/2011 | Agapiou et al. |
| 8,189,963 B2 | 5/2012 | Li et al. |
| 8,249,941 B2 | 8/2012 | Saul et al. |
| 8,510,338 B2 | 8/2013 | Cushman, II et al. |

(Continued)

FOREIGN PATENT DOCUMENTS

| | | | |
|---|---|---|---|
| CA | 2825498 | 5/2017 | |
| WO | WO-2009105126 A1 * | 8/2009 | ............ G06T 13/20 |

OTHER PUBLICATIONS

Blum et al., "Selection of Relevant Features and Examples in Machine Learning", Artificial intelligence, vol. 97, No. 1,, 1997, 24 pages.

(Continued)

*Primary Examiner* — Michael J Cobb
(74) *Attorney, Agent, or Firm* — Kilpatrick Townsend & Stockton LLP

(57) ABSTRACT

Described herein are a system and techniques for performing partially or fully automatic retopology of an object model. In some embodiments, the techniques may involve categorizing and/or segmenting an object model into a number of regions. 3D data in each region may then be compared to 3D data in corresponding regions for a number of similar object models in order to identify a closest matching corresponding region. The techniques may also involve identifying a set of edges stored in relation to each closest matching corresponding region for each region of an object model. Each set of edges may be conformed to the 3D data of its corresponding region. Once conformed, the sets of edges may be compiled into a cage for the object model, from which a mesh may be generated.

14 Claims, 13 Drawing Sheets

(56) References Cited

U.S. PATENT DOCUMENTS

| | | | |
|---|---|---|---|
| 8,654,121 B1* | 2/2014 | Yu | G06T 17/205 345/419 |
| 8,732,025 B2 | 5/2014 | Gokturk et al. | |
| 8,787,679 B1 | 7/2014 | Ramesh et al. | |
| 8,897,578 B2* | 11/2014 | Huang | G06K 9/4642 382/225 |
| 9,053,392 B2 | 6/2015 | Yang et al. | |
| 9,189,854 B2 | 11/2015 | Dhua et al. | |
| 9,208,401 B2 | 12/2015 | Westphal | |
| 9,280,560 B1 | 3/2016 | Dube et al. | |
| 9,378,065 B2 | 6/2016 | Shear et al. | |
| 9,607,422 B1* | 3/2017 | Leedom | G06T 15/00 |
| 9,672,497 B1 | 6/2017 | Lewis et al. | |
| 2003/0174179 A1 | 9/2003 | Suermondt et al. | |
| 2005/0021499 A1 | 1/2005 | Bradley et al. | |
| 2007/0253618 A1 | 11/2007 | Kim et al. | |
| 2008/0082426 A1* | 4/2008 | Gokturk | G06F 17/30256 705/26.62 |
| 2009/0094260 A1 | 4/2009 | Cheng et al. | |
| 2010/0321386 A1 | 12/2010 | Lin et al. | |
| 2013/0275089 A1* | 10/2013 | Gary | G06T 17/205 703/1 |
| 2014/0351078 A1 | 11/2014 | Kaplan et al. | |
| 2015/0003723 A1 | 1/2015 | Huang et al. | |
| 2015/0058116 A1 | 2/2015 | Liu et al. | |
| 2015/0095196 A1 | 4/2015 | Burks et al. | |
| 2015/0147460 A1* | 5/2015 | Manzi | B05B 12/122 427/8 |
| 2015/0169994 A1* | 6/2015 | Chinen | G06K 9/6215 382/218 |
| 2015/0178986 A1* | 6/2015 | Schpok | G06T 17/05 345/420 |
| 2015/0302027 A1* | 10/2015 | Wnuk | G06F 17/30268 382/305 |
| 2015/0339853 A1* | 11/2015 | Wolper | G06T 17/00 345/423 |
| 2016/0005228 A1* | 1/2016 | Niebla, Jr. | H04N 13/122 348/43 |
| 2016/0125650 A1* | 5/2016 | Crocker | G06T 17/20 345/423 |
| 2016/0196691 A1* | 7/2016 | Crocker | G06T 17/205 345/423 |
| 2016/0266939 A1 | 9/2016 | Shear et al. | |
| 2016/0284116 A1 | 9/2016 | Crain et al. | |
| 2016/0292592 A1 | 10/2016 | Patthak et al. | |
| 2017/0061286 A1 | 3/2017 | Kumar et al. | |
| 2017/0085863 A1* | 3/2017 | Lopez | H04N 13/261 |
| 2017/0103510 A1 | 4/2017 | Wang et al. | |
| 2017/0109924 A1* | 4/2017 | Crocker | H04N 1/00827 |
| 2017/0161590 A1 | 6/2017 | Boulkenafed et al. | |
| 2018/0144535 A1* | 5/2018 | Ford | G06T 15/005 |
| 2018/0253895 A1* | 9/2018 | Arumugam | G06K 9/00208 |
| 2018/0330480 A1* | 11/2018 | Liu | G06T 17/205 |

OTHER PUBLICATIONS

Chilton et al., "Cascade: Crowdsourcing Taxonomy Creation", Proceedings of the SIGCHI Conference on Human Factors in Computing Systems, ACM, Apr. 27-May 2, 2013, pp. 1999-2008.

Deng et al., "Imagenet: A Large-Scale Hierarchical Image Database", IEEE Conference on Computer Vision and Pattern Recognition, CVPR 2009,, Jun. 2009, 8 pages.

Lai et al., "A Large-Scale Hierarchical Multi-View RGB-d Object Dataset", Robotics and Automation (ICRA), 2011 IEEE International Conference on. IEEE,, 2011, 8 pages.

U.S. Appl. No. 15/586,207, entitled "Automated Matrix Photo Framing Using Range Camera Input," filed May 3, 2017.

PCT/US2019/033394, "International Search Report and Written Opinion", dated Sep. 27, 2019, 14 pages.

* cited by examiner

SYSTEM AND TECHNIQUES FOR AUTOMATED MESH RETOPOLOGY

BACKGROUND

When creating a virtual representation of an object, high quality object models created from real world scanned models, due to their nature, usually include millions of polygons. This is usually because slight variations in detected depth or lighting may result in the creation of a number of extra polygons which are not ultimately necessary in the object model. These models require a large amount of memory to store and/or manipulate. In order to better serve their purposes, object models often should have a much lower polycount (count of polygons) than they are initially created with. Additionally, they may need to have specific edgeflows in order to be more easily animated, or further detailed.

In order to create useful object models, the mesh associated with an object model often needs to be retopologized from a high resolution mesh to a low resolution mesh. Retopology is the process of rebuilding a mesh of an object model in order to reduce polygon count. Retopology is widely used by digital sculptors to convert their object models into usable assets in game, film, or other electronic projects. Retopology can be used to remove discrepancies from an object model, such as discontinuities and/or repeated details. Conventionally, retopology is a time-intensive process that requires manual (often subjective) analysis and editing by an artist. Because this process requires identification of edges, which requires subjective interpretation to be provided by an artist, the process has conventionally not been able to be automated.

Embodiments of the invention address these and other problems, individually and collectively.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Techniques described herein are directed to a system and methods for retopologizing a three-dimensional (3D) model using a library of artist retopologies. In some embodiments, an object modeled in the object model may be identified. For example, the system may identify a category of object into which the object model falls. Once the object has been categorized, the system may identify a number of regions associated with objects of that category. The system may then match 3D data located in various regions to corresponding 3D data stored in relation to corresponding regions of other objects of the identified category to determine a closest match. An artist's actions (e.g., identifications of edges or previously generated meshes) stored with respect to the matched region may then be applied to the region of the object model. Mesh data identified in this manner may be combined for each of the various regions of the object model in order to generate appropriate meshes for the object model. The object model may then be retopologized based on the identified mesh data.

One embodiment of the disclosure is directed to a method of retopologizing an object model comprising receiving a first object model comprising 3D data associated with an object, determining a number of regions into which the first object model should be segmented, assigning, to each of the number of regions, separate portions of the 3D data of the first object model, identifying, for each of the number of regions, a closest matching corresponding region from at least one second object model, determining a set of edges associated with each of the closest matching corresponding regions from the at least one second object model, compiling each of the sets of edges into a cage for the first object model, and generating, from the cage, a retopologized object model.

Another embodiment of the disclosure is directed to a computing system comprising a processor and a memory including instructions that, when executed with the processor, cause the computing system to, at least: receive a first object model associated with an object, assign, to each of a number of regions, separate portions of the first object model, identify, for each of the number of regions, a closest matching corresponding region from at least one second object model, determine a set of edges associated with each of the closest matching corresponding regions from the at least one second object model, compile each of the sets of edges into a cage for the first object model, and generate, from the cage, a retopologized object model.

Yet another embodiment of the disclosure is directed to a control unit apparatus comprising a non-transitory computer readable medium including programmable instructions that, when executed, cause the control unit apparatus to perform the method of: obtaining a first version of an object model, the object model comprising a 3D representation of an object, segmenting 3D data of the object model into a number of regions, identifying a closest matching corresponding region for each of the number of regions, identifying a set of edges associated with each closest matching corresponding region, combining each of the identified sets of edges into a cage, and generating a second version of the object model from the cage.

For a fuller understanding of the nature and advantages of the present invention, reference should be made to the ensuing detailed description and accompanying drawings.

BRIEF DESCRIPTION OF THE DRAWINGS

Various embodiments in accordance with the present disclosure will be described with reference to the drawings, in which.

DETAILED DESCRIPTION

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Figure 1:
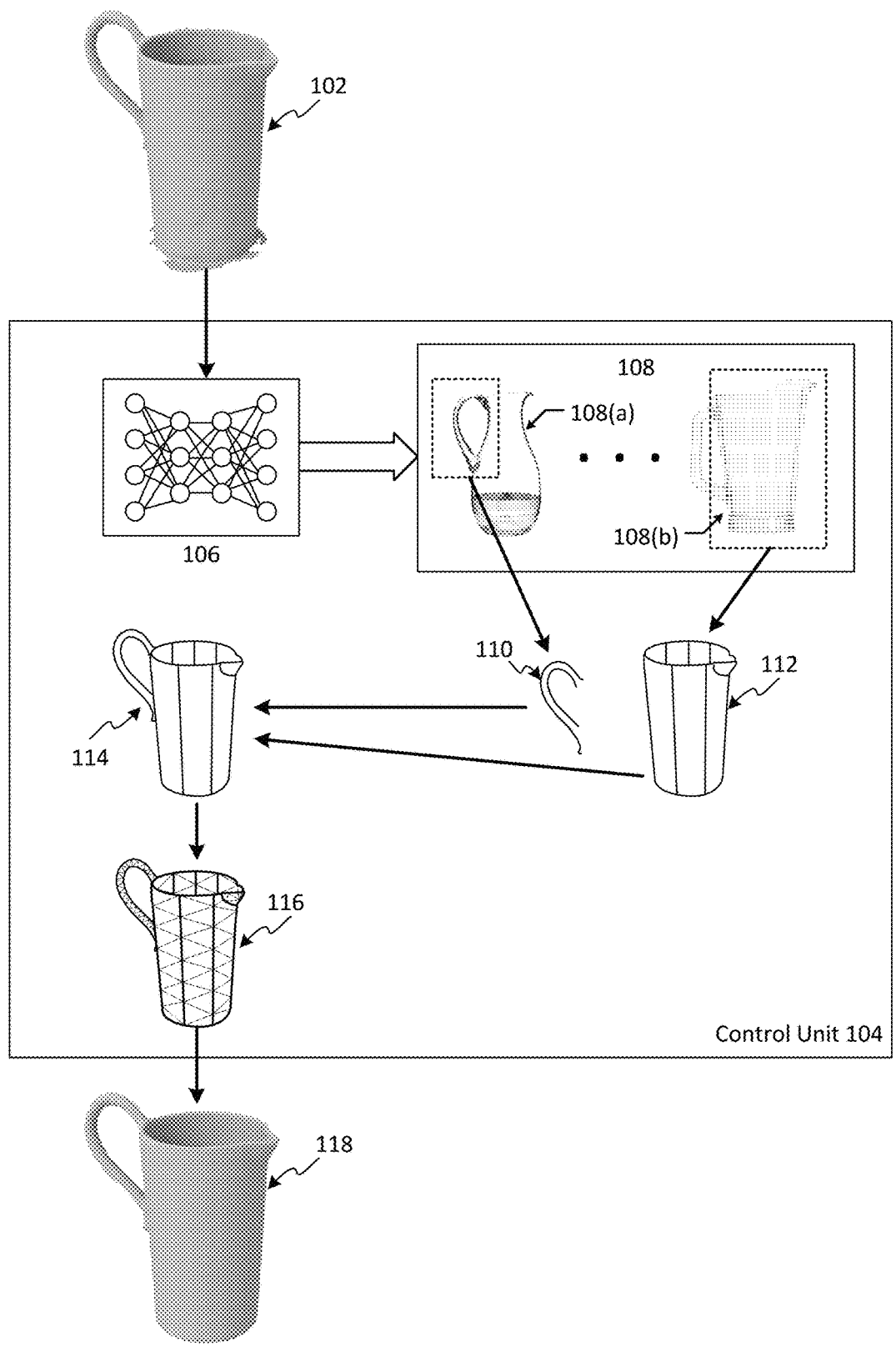
FIG. 1 depicts an illustrative overview of an example system in which a high-resolution object model may be retopologized to a low-resolution object model in accordance with at least some embodiments.

FIG. 1 depicts an illustrative overview of an example system in which a high-resolution object model may be retopologized to a low-resolution object model in accordance with at least some embodiments. In FIG. 1, a first object model 102 is obtained by a control unit 104. The first object model 102 may be a high-resolution object model that includes a relatively large number of polygons. In some embodiments, object model 102 may be obtained by translating 3D data (generated by scanning an object) into a mesh. In some embodiments, object model 102 may be obtained upon creation of the object by an artist. As depicted, the object model 102, when obtained, may be rough, in that it may include a number of discrepancies or noise. These discrepancies may be represented by a number of polygons which are unnecessary to an accurate version of the object model.

For the purposes of this disclosure, a mesh (or 3D mesh) may be any collection of three dimensional (3D) geometry data (e.g., vertices, edges and faces) that defines the shape of an object. In some embodiments, 3D data may include point cloud data, voxel data, or any other suitable type of three-dimensional geometry. Point cloud data may be any collection of data points defined by any suitable coordinates system. Point cloud data may be generated by 3D scanners that gather point measurements (e.g., depth data) from real-world objects or photos. A point cloud can be translated into a mesh and vice versa. It should be noted that the object model 102 may be received as a mesh, point cloud data, or any other suitable 3D representation of an object. A voxel (volumized pixel) is a unit of graphic information that defines a point in three-dimensional space.

Upon being received by the control unit 104, the object model 102 may be processed to identify a type or category associated with the object model. For example, the object model 102 depicted in FIG. 1 is a pitcher. In order to make this categorization, the control unit 104 may use a machine learning model 106 which has been trained using a number of object models for various items. The machine learning model 106 may use any suitable type of machine learning algorithm. For example, the machine learning model 106 may be a neural network. Once categorized, the control unit 104 may identify a number of object regions typically associated with an object of the identified type or category. For example, a pitcher may typically comprise regions associated with a handle and a body. However, it should be noted that object models of some objects may not include certain regions. For example, an object model of a particular pitcher may not include mesh data associated with a handle region. Hence, some regions associated with an object category or type may be necessary regions and some regions associated with an object category or type may be optional regions. In some embodiments, the type or category for an object model may be provided (e.g., by a user upon submission of the object model).

In accordance with at least some embodiments, the control unit 104 may maintain, or have access to, one or more object catalogs 108. The object catalogs may contain object models (3D representation data) associated with a number of different objects. In some embodiments, various regions of an object model or object models stored in the catalog 108 may each be associated with a label identifying that region. In some embodiments, the catalog 108 may include at least some object models that have been manually retopologized by an artist. In these object models, the artist may have manually labeled each region of the object model when identifying edges and/or generating a mesh for that object model. In some embodiments, various regions of object models may be stored separately. This may or may not involve the use of specialized databases. For example, the control unit 104 may separately maintain a pitcher handle database as well as a pitcher body database.

To process the object model 102, the control unit 104 may identify segments of the object model which are associated with each region of the object. The control unit may then identify a closest match for that region of that category of object from the object models in the one or more object catalogs 108. For example, the control unit 104, upon processing the object model 102, may determine that a segment 110 corresponding to a first region of the object model 102 most closely matches that of a first particular object (108a), whereas a segment 112 corresponding to a second region of the object model 102 most closely matches that of a second particular object (108b). By way of illustration, in the example depicted in FIG. 1, the control unit 104 may determine that while a segment of the object model 102 corresponding to a handle most closely matches that of a first pitcher 108a, the segment of the object model 102 corresponding to the body most closely matches that of a second pitcher 108b. Any suitable technique may be used to identify a closest match for a segment of the object model. For example, the control unit may use the machine learning model 106 to identify a closest match.

The control unit 104, upon identifying a closest match for each of the segments of the object model 102, may then identify meshes that have been generated or edges that have been defined (e.g., by an artist or otherwise) for the identifying matching regions. In some embodiments of this process, meshes previously generated for each of the identified matching regions may be aligned to the corresponding segments of the object model. In some embodiments of this process, the edges defined with respect to the matched regions may be overlaid onto the corresponding segments of the object model. The edges may then be reconfigured to conform to the overlaid segment. For example, the defined edges may be readjusted so that they lie along the surface of the object model 102. For example, various vertices of the defined edges may be "snapped to" vertices of the object model 102. It should be noted that the closer that a segment matches its corresponding matched region, the less that the edges will need to be adjusted. In some embodiments, the control unit 104 may determine whether the adjustment to be made to the edges to make it conform to the object model is greater than some threshold level of adjustment. If the control unit 104 determines that the adjustment is too great, the control unit 104 may break the segment into subsegments, which it may then map to subregions of different object models. For example, if the edges identified as most closely matching segment 110 cannot be conformed to the segment 110 without significant adjustment to those edges, then the control unit 104 may match a first subregion to a top of segment 110 and a second subregion to a bottom of segment 110. In this example, the edges or meshes for the identified first subregion and second subregion may be from different object models.

Once the control unit 104 has configured the identified mesh data (e.g., meshes and/or edges) so that they conform to their corresponding segments of the object model 102, the control unit 104 may combine that mesh data into a single model 114 wherein the positions of each of the edges correspond to the positions of their associated segments. The control unit 104 may then generate a new mesh 116 from that model 114. In some embodiments, this may be done by combining the mesh data for each segment and removing any extraneous mesh data. In some embodiments, this may be done by combining the edge data for each segment (e.g., to create a cage) and generating a number of polygons between each of the edges. Each of these variations are described in greater detail below. The result of the process described above is an object model 118 which does not include the discrepancies or noise included in the object model 102. The object model 118 may be a low resolution object model, or at least a low resolution object model in relation to object model 102 (i.e., the object model 118 may have fewer polygons than object model 102). The control unit 104 may create polygons of any suitable size within the new mesh 116. In some embodiments, a user may select a size for each of the polygons. In some embodiments, a user may specify a polycount to be achieved using the system described herein.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
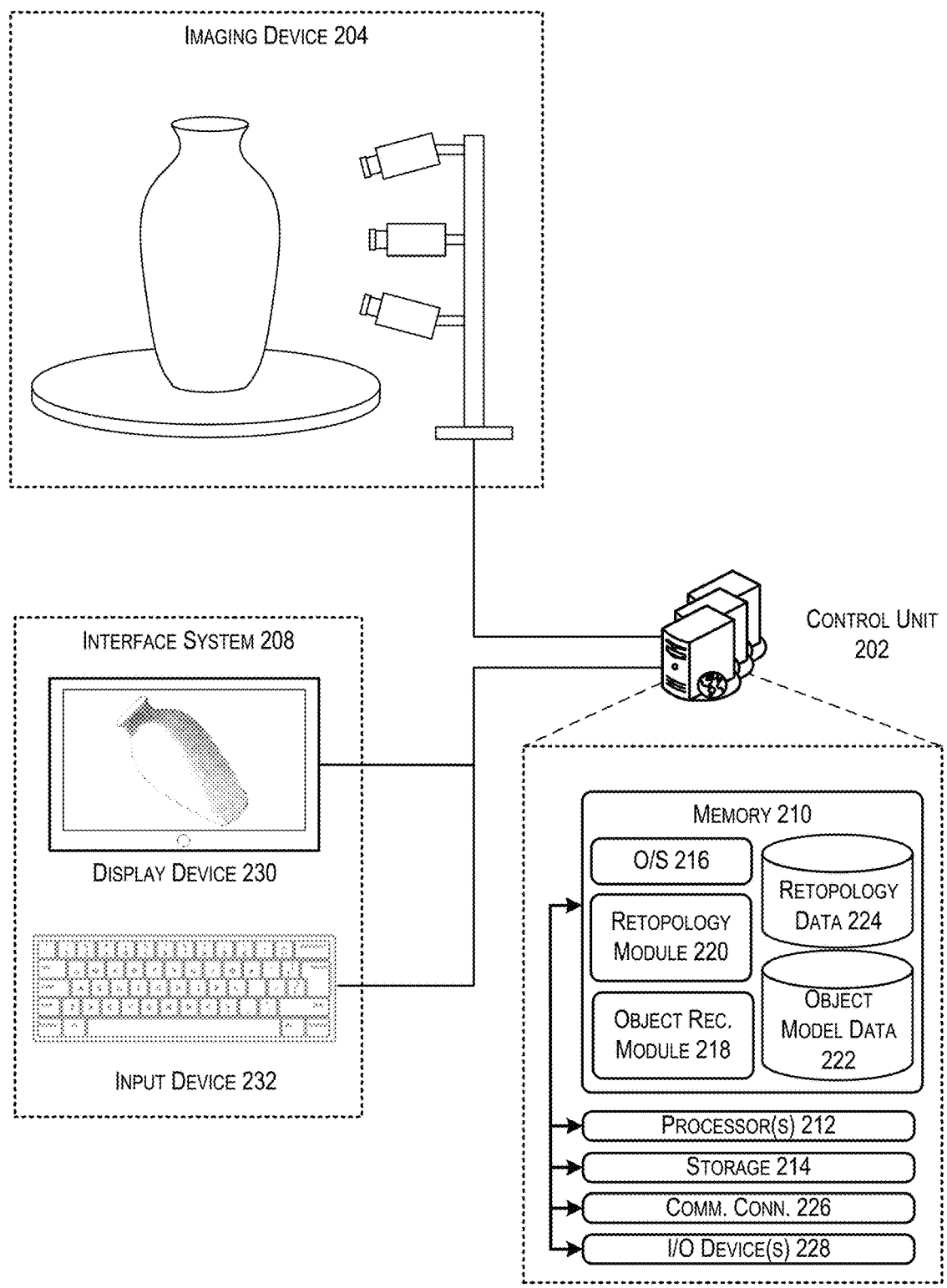
FIG. 2 depicts an example system architecture for a retopology system that may be implemented to perform the functionality described in accordance with at least some embodiments.

FIG. 2 depicts an example system architecture for a retopology system that may be implemented to perform the functionality described in accordance with at least some embodiments. In FIG. 2, a control unit 202 may be in communication with a number of other components, including at least an imaging device 204, and an interface system 208.

The control unit 202 may be any type of computing device configured to perform at least a portion of the functionality described herein. In some embodiments, the control unit 202 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the control unit 202 may include at least one memory 210 and one or more processing units (or processor(s)) 212. The processor(s) 212 may be implemented as appropriate in hardware, computer-executable instructions, firmware or combinations thereof. Computer-executable instruction or firmware implementations of the processor(s) 212 may include computer-executable or machine executable instructions written in any suitable programming language to perform the various functions described.

The memory 210 may store program instructions that are loadable and executable on the processor(s) 212, as well as data generated during the execution of these programs. Depending on the configuration and type of control unit 202, the memory 210 may be volatile (such as random access memory (RAM)) and/or non-volatile (such as read-only memory (ROM), flash memory, etc.). The control unit 202 may also include additional storage 214, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 210 may include multiple different types of memory, such as static random access memory (SRAM), dynamic random access memory (DRAM) or ROM. Turning to the contents of the memory 210 in more detail, the memory 210 may include an operating system 216 and one or more application programs or services for implementing the features disclosed herein including at least a module for categorizing a represented object (object recognition module 218) and/or a module for retopologizing object model data (retopology module 220). The memory 210 may also include object model data 222, which provides information associated with object models stored in association with a number of different objects, as well as retopology data 224, which provides information related to edge identification for various object models stored in association with a number of different objects. In some embodiments, the object model data 222 and/or retopology data 224 may be stored in a database.

The memory 210 and the additional storage 214, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the control unit 202. The control unit 202 may also contain communications connection(s) 226 that allow the control unit 202 to communicate with a stored database, another computing device or server, user terminals, and/or other components of the retopology system. The control unit 202 may also include input/output (I/O) device(s) and/or ports 228, such as for enabling connection with a keyboard, a mouse, a pen, a voice input device, a touch input device, a display, speakers, a printer, etc.

In some embodiments, the object recognition module 218 may be configured to, in conjunction with the processors 212, identify a category of object into which a received object model belongs. In some embodiments, the object recognition module 218 may use one or more machine learning techniques (e.g., a neural network) to match received object model data to object model data stored in relation to a number of objects in an electronic catalog. In some embodiments the system may identify via pattern recognition (e.g., by being trained using categorized object models) features which can be attributed to particular categories of object. The system may then match features on the received object model to features attributed to various object categories. It should be noted that the received object model may be a high-resolution object model whereas the object models stored in the object model data 222 may be either high-resolution or low-resolution object models.

In some embodiments, the high-resolution object models will include polygons numbering in the millions or more (e.g., 3 million or more), and the low-resolution object models will include polygons numbering significantly less than 50,000 (e.g., along the order of 10,000 or fewer polygons). In some embodiments, the high-resolution and low-resolution object models are distinguishable from one another in that the low-resolution object models have less than 3%, and in some cases, less than 1% of the number of polygons that are included in the high-resolution object models.

In some embodiments, the system may store an indication of separate regions or features to be associated with various object categories. In some embodiments, the system may maintain, with respect to each object model category, an indication of different regions to be associated with sections of an object model that falls within that category. Once the object recognition module 218 has identified a category into which the object model belongs, the object recognition module 218 may then identify the different regions associated with that object model. The system may then identify regions of data in the object model which correspond to each of the identified regions for that category. In some embodiments, the object recognition module 218 may then match the object model data for each region to corresponding object model data for different objects in the object model data 222.

By way of illustration, consider a scenario in which the object recognition module 218 receives a 3D object model which represents a chair. In this example, the object recognition module 218 may categorize the object model as a "chair" based on that object model sharing characteristics which are typically attributed to chairs. Once the object model has been categorized as a chair, the system may identify a number of regions stored in relation to chairs. For example, the system may identify a support structure region, a seat region, a back rest region, and one or more arm rest regions. The object recognition module 218 may then identify object model data from the received chair object model which maps to each of those regions. For example, the object recognition module 218 may identify a portion of a 3D mesh for the chair object model that corresponds to the seat region. Once object model data has been identified for each separate region, the object recognition module 218 may identify other object models in the object model database 222 for which the corresponding object model data most closely matches. In the example described, the object recognition module 218 may identify a first chair object model having a seat that most closely matches the seat of the received chair object model. The object recognition module 218 may also identify a second chair object model (potentially different from the first chair object model) having a support structure that most closely matches the support structure of the received chair object model. This may be repeated for each region of the received chair object model.

In some embodiments, the retopology module 220 may be configured to, in conjunction with the processors 212, generate a low-resolution object model for a received high-resolution object model. In some embodiments, the retopology module 220 may first identify and compile a number of previously-generated meshes for each segment of the object model. In particular, the retopology module 220 may identify, for each matching region identified by the object recognition module 218, a mesh which has previously been generated by an artist. Once the retopology module 220 has identified meshes for each region of the object model, the retopology module 220 may align the identified meshes to their corresponding regions of the object model. One skilled in the art would recognize that there are a number of known techniques for aligning meshes to object models which could be utilized by the retopology module 220. For example, the retopology module 220 may use rough placement, Iterative Closest Point (ICP), or even manual placement. Once each identified mesh has been aligned, all of the identified meshes may be combined into a single mesh by combining the aligned meshes in their relative positions. In some embodiments, the retopology module 220 may remove or otherwise eliminate any overlap in the combined meshes.

As an alternative technique, in some embodiments, the retopology module 220 may first identify and compile a number of edges and vertices for the object model. The retopology module 220 may then generate a 3D mesh by creating polygons which are defined by the compiled edges and vertices. In this process, the retopology module 220 may match object model data 222 identified by the object recognition module 218 for each region to a set of edges corresponding to that region in the retopology data 224. The set of edges identified in this manner may represent the edges and vertices generated by an artist for the matched object model. Once a set of edges and vertices has been identified for each region of the received object model, the sets of edges may be combined into a compiled set of edges and vertices. The compiled set of edges and vertices may then be conformed to the object model (e.g., by snapping the vertices in the compiled set of edges and vertices to vertices of the received object model). Once the compiled set of edges and vertices has been conformed to the object model, a low-resolution 3D mesh may be generated by creating polygons which are bounded by the edges and vertices. It should be appreciated that several techniques for generating polygons from a set of edges are available, any of which can be utilized to achieve the purposes of this disclosure. The low-resolution object model, once generated, may then be stored in the object model data 222. Additionally, in some embodiments, the compiled set of edges and vertices, after having been conformed to the object model, may be stored in retopology data 224.

In some embodiments, the object model data 222 may contain a number of object models associated with a variety of different objects. For example, a retailer or other merchant may maintain an electronic catalog of objects that are offered by that merchant. In this example, an object model database 222 may include high-resolution object models, low-resolution object models, or some combination of both. It should be noted that the object model data 222 may include a number of different object models for each category. For example, the object model data 222 may include object models for different brands or versions of objects of the same object category. In some embodiments, an object model may be labeled (e.g., by an artist or other user) with an indication as to various regions of that object model, such that object model data falling within a particular region can be identified. Additionally, the labeled object model data may be assessed by a machine learning algorithm to determine regions to be associated with different categories of objects. Furthermore, the object model data 222 may be stored as a hierarchical taxonomy of objects and their regions. For example, a taxonomic scheme may be used in which various objects are stored as separate elements or regions. The object model data 222 may store a relationship between each of the separate regions. In this way, the object model data 222 may be used to identify a particular category of object, a particular region of that category of object, a particular element within a region of that category of object, and so forth.

In some embodiments, the retopology data 224 may contain a number of edges and/or vertices generated with respect to object models. In some embodiments, the number of edges and/or vertices may be generated by an artist or another user for a particular object model. Positional information for each of the number of edges and/or vertices may be stored in retopology data 224 so that the system can identify a set of edges and/or vertices associated with a particular region of the corresponding object model. It should be noted that the retopology data 224 may include a corresponding set of edges and/or vertices for each object model stored in the object model data 222.

In some embodiments, an imaging device 204 may be any device or structure configured to obtain object model information for an object. In some embodiments, the imaging device 204 may include an object positioning platform (with or without a platform rotator), and one or more sensor arrays (either adjustable or static). The object positioning platform may be a rotatable platform upon which one or more items can be placed for imaging of the items using the one or more sensor arrays. In some embodiments, the rotatable platform may be configured to be rotated by a platform rotator in order to reposition the item on the platform. The platform rotator may be a motor configured to activate and cause the object positioning platform to rotate. The one or more sensor arrays may include a number of sensor devices and corresponding adjustment mechanisms. The one or more sensor devices may include any combination of camera devices, including range camera devices (e.g., a depth sensors) capable of generating a range image, and cameras configured to capture image information. Each of the one or more sensor arrays may include camera devices arranged in an array or matrix (e.g., in rows and columns). An illustrative example of an imaging device 204 that may be implemented in accordance with at least some embodiments is described in patent application Ser. No. 15/586,207 to Sheffield et al., entitled "Automated Matrix Photo Framing Using Range Camera Input," which is herein incorporated by reference in its entirety.

In some embodiments, the 3D retopology system may include an interface system 208. An interface device may include any combination of display devices 230 and/or input devices 232. In some embodiments, each of the display device 230 and the input device 232 may be separate devices which are communicatively coupled. The display device may include any means for presenting information to a user or users. In some embodiments, the display device 230 may include outputs for audio presentation of data. In some embodiments, the display device may be wearable. For example, the display device 230 may be a virtual reality (VR) or augmented reality (AR) headset.

The input device 232 may be any device configured to receive input from a user and convert that input into machine executable instructions. In some embodiments, input devices 232 may include mouse, keyboards, joysticks, or any other suitable means of receiving user input. In some embodiments, the interface system 208 may be used, in conjunction with the control unit 202, to manipulate various components of the imaging device 204.

Figure 3A:
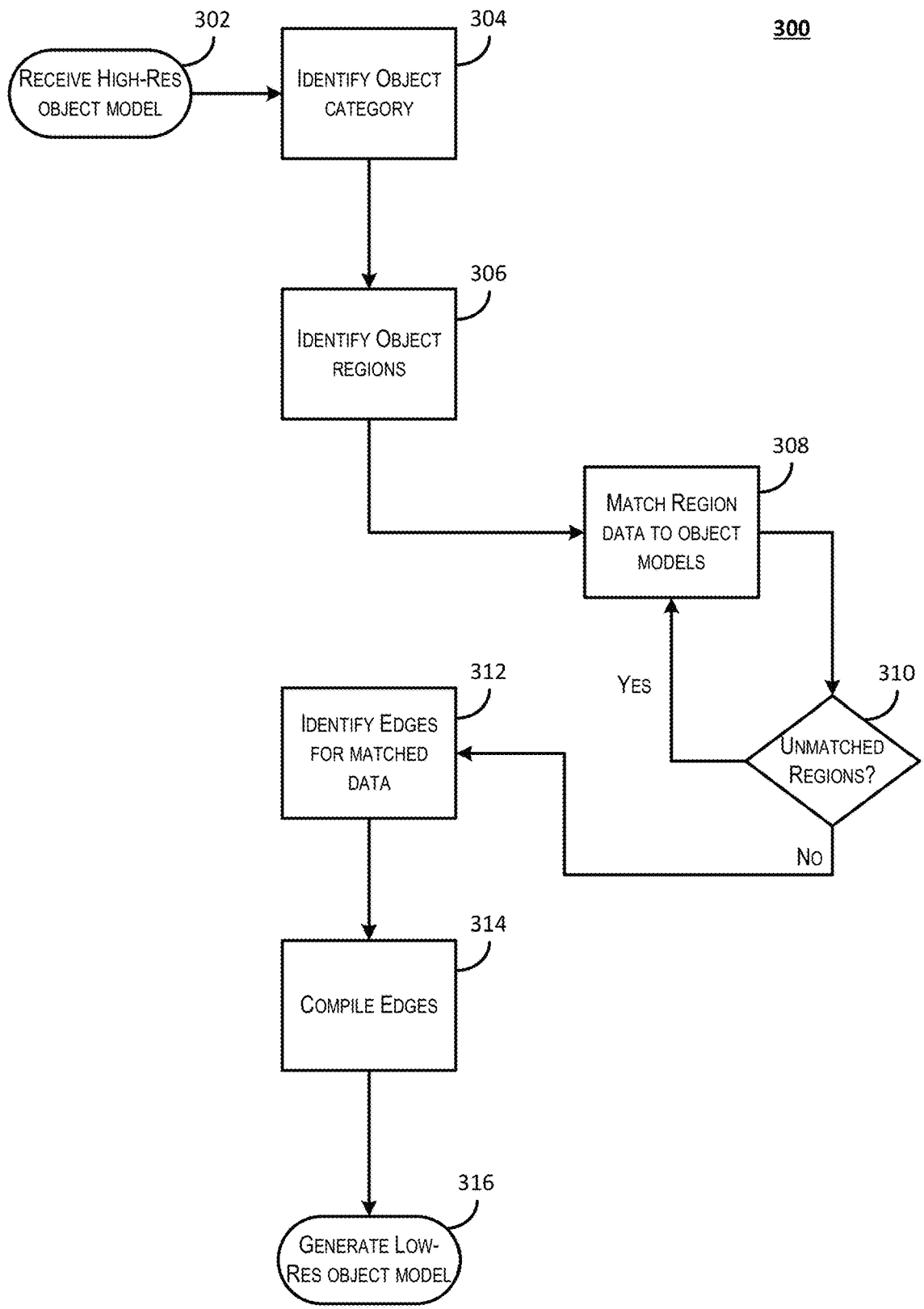
FIG. 3A depicts a process for generating a low-resolution 3D mesh from a high-resolution 3D mesh using a first technique in accordance with at least some embodiments.

FIG. 3A depicts a process for generating a low-resolution 3D mesh from a high-resolution 3D mesh using a first technique in accordance with at least some embodiments. Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3A may be performed by at least the one or more control units 202 shown in FIG. 2. The code may be stored on a computer-readable storage medium, for example, in the form of a computer program including a plurality of instructions executable by one or more processors. The computer-readable storage medium may be non-transitory.

Process 300 may begin at 302, when the system receives a 3D representation of an object (i.e., an object model) which is determined to be a high-resolution object model. In some embodiments, the system may treat any object model received in this fashion as a high-resolution model and may subject that object model to process 300. In some embodiments, the system may determine that an object model is a high-resolution model upon determining that a number of polygons per some area is greater than some threshold number.

Upon receiving the object model, the system may identify a category into which the object model belongs at 304. For example, the system may identify a category of object for which 3D data for the objects in that category most closely match 3D data for the received object model. In some embodiments, one or more machine learning techniques may be used to perform this object recognition process. In some embodiments, step 304 may involve the use of a neural network machine learning model. In these embodiments, the system may train the neural network using a catalog of object models with known categories. The system may then provide the received object model as input to the trained neural network. In some cases, the neural network may assign probabilities to the object model based on comparisons to other object models in the object model catalog and may select the category having the highest probability.

Once the system has identified an object category to be associated with the received object model, the system may identify a number of regions associated with that particular object category at 306. In some embodiments, the system may separate the object model into a number of identified regions by assigning, to each of those regions, object data located within particular locations of the object model which are associated with those regions. In some embodiments, the machine learning model used to identify a category of the object model may be different from the machine learning model used to separate the object model into regions.

Upon separating the object model data into a number of regions, the system may, for each region, identify a corresponding region of another object model in the same category as the received object model which most closely matches that of the received object model at 308. For example, if the object model is a representation of a pitcher which has been separated into handle and body regions, then the system may identify a first closest match for the handle region and a second closest match for the body region. In this example, the first closest match may be an object model of another pitcher for which the object model data assigned to the handle region most closely matches the object model data assigned to the handle region of the received object model. Additionally, the second closest match may be an object model of another pitcher for which the object model data assigned to the body region most closely matches the object model data assigned to the body region of the received object model.

At 310, the system may determine whether any regions have not been matched to corresponding regions of another object model of the same type. If any regions have remained unmatched, then the system may return to 308 to match those regions. It should be noted that in some situations, the system may not be capable of matching a region of an object model to a most closely matching corresponding region of another object model. For example, the received object model may include an extra feature or decoration that is not typically included in object models of its category. In some embodiments, the system may attempt to match the region information to 3D data that matches the 3D data in that region on an object model belonging to a separate category of object model. In some embodiments, the system may proceed with the process 300, while leaving one or more regions unmatched. In these embodiments, an artist may be tasked with manually identifying a set of edges for the unmatched region only. For example, in the situation in which an object model includes 3D ornamentation that is atypical of object models of its category, the system may construct a set of edges (as described below) for the object model which does not include edges for the 3D ornamentation. In this example, once the rest of the edges have been compiled, the compiled set of edges and/or object model may be provided to an artist (or other user) for identification of the edges associated with that ornamentation. The artist may then manually identify the edges of the ornamentation.

Once closest matches have been identified for each region of the received object model, the system may identify mesh data associated with each of the identified regions. It should be noted that the process 300 may proceed in a number of different ways, at least some of which are described below. Using a first technique, the process 300 may, identify a set of edges for each of the closest matched regions at 312. In some embodiments, a relationship may be maintained between each region of an object model and a corresponding set of edges identified for that region. In some embodiments, the sets of edges for each of the identified regions may have been created manually (e.g., by an artist) or automatically (e.g., by use of the system described herein). Once a set of edges has been identified for a particular region, that set of edges may be conformed to the region of the received object model. This may involve the set of edges for the closest match region being overlaid onto the object model data of the corresponding region of the received object model. The vertices and/or edges in the set of edges may then be "snapped to" the vertices and/or edges of the object model data onto which it has been overlaid. To do this, one or more edges or vertices may be repositioned, stretched, or otherwise updated to rest on the surface of the received object model data.

After each of the sets of edges for each region having been conformed to their corresponding object model data, the sets of edges may be combined into a compiled set of edges (e.g., a "cage") for the object model at 314. In some embodiments, this may involve positioning each of the conformed set of edges in positions that correspond to that of their associated region of the received object model. A cage may be any set of edges which defines the bounds of an object model. Once a compiled set of edges has been generated for the received object model in this manner, the system may generate a low-resolution object model from the cage at 316. This may involve generating a number of polygons between various edges of the cage by creating new edges which connect a vertex on one edge of the cage to a vertex on a second edge of the cage. In some embodiments, the number of polygons generated per some amount of area may be predetermined.

Figure 3B:
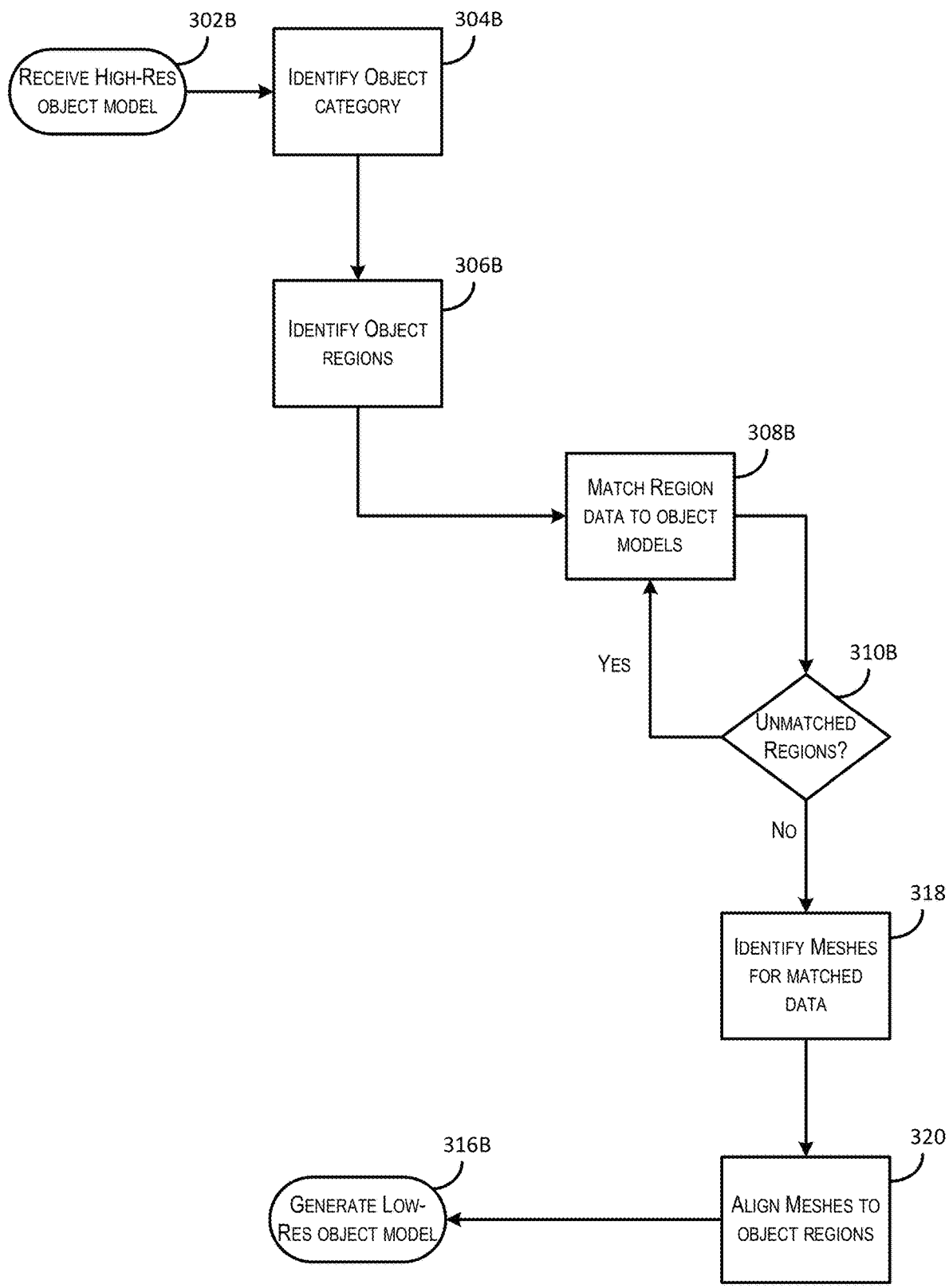
FIG. 3B depicts a process for generating a low-resolution 3D mesh from a high-resolution 3D mesh using a second technique in accordance with at least some embodiments.

FIG. 3B depicts a process for generating a low-resolution 3D mesh from a high-resolution 3D mesh using a second technique in accordance with at least some embodiments. In FIG. 3B, reference numbers 302B, 304B, 306B, 308B, 310B, and 316B designate aspects of the second technique that correspond to reference numbers 302, 304, 306, 308, 310, and 316 in FIG. 3A. Using this second technique, the process 300 may, from 310 as described above, involve identifying a mesh that has been generated for each of the matched regions at 318. The identified meshes may have been generated manually (e.g., by an artist) or automatically (e.g., via the system described herein). The process may then involve aligning each of the identified meshes with their corresponding regions of the object model at 320. In some embodiments, this may involve repositioning each mesh until it is aligned with its respective region and stretching or shortening portions of the mesh until the shape of the mesh roughly matches the surface of the region. Once each of the identified meshes has been aligned to its respective region of the object model, the meshes may be combined by capturing the aligned mesh data in its respective locations and a low-resolution object model can be generated 316B. In some embodiments, the process 300 may further involve removing or otherwise eliminating overlap between the meshes. The overlap may be eliminated, in some embodiments, by applying a boolean mesh union function to the aligned mesh data. The invention, however, is not limited to this technique for eliminating overlap inasmuch as other techniques can be applied to eliminate the overlap without creating any significant or noticeable discrepancies in the resulting mesh.

Figure 4:
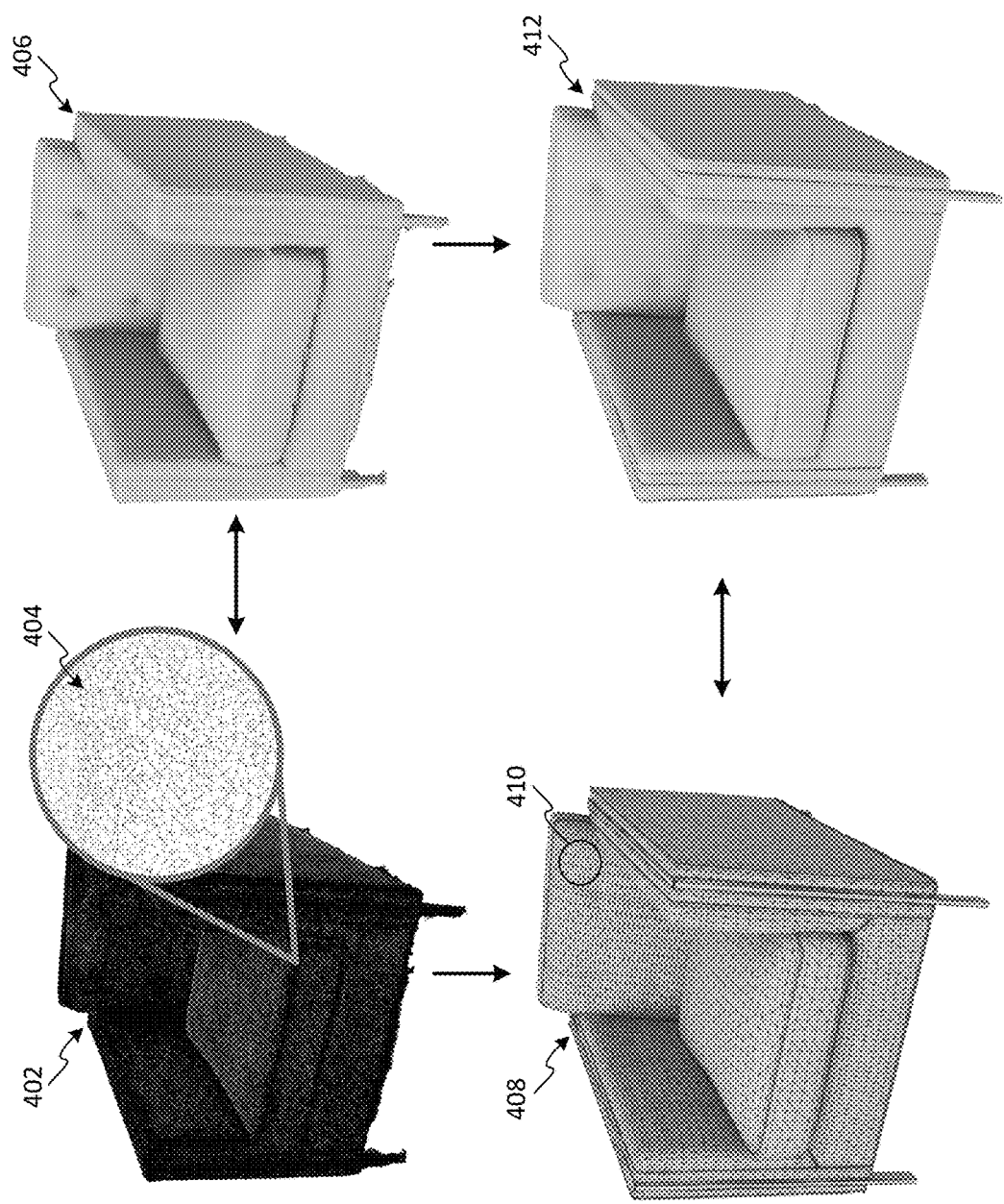
FIG. 4 depicts a first illustrative example of a relatively high-resolution object model having been retopologized to a relatively low-resolution object model in accordance with at least some embodiments.

FIG. 4 depicts a first illustrative example of a relatively high-resolution object model having been retopologized to a relatively low-resolution object model in accordance with at least some embodiments. As depicted in FIG. 4, a first object model 402 of an object (a chair) may be generated by converting point cloud data (obtained from scanning a corresponding object) into a high-resolution mesh. As depicted by the blown-up section 404, the mesh may consist of a number of polygons arranged in any suitable manner. Also provided is a visual representation 406 of the object model 402 which depicts a rough image of the chair. As depicted, the visual representation may include a number of discrepancies or noise. Such discrepancies may include rough surface area, holes, protrusions, or any other suitable variation from an actual or expected visual representation of an object. One skilled in the art would recognize that each of these discrepancies may be associated with a number of polygons which are extraneous to (unnecessary for) the object model 402.

Using the retopologization techniques described herein, the system may generate a second object model 408 which includes a relatively low-resolution mesh (when compared to the high-resolution mesh). For example, each section 410 of the object model 408 will have fewer polygons than corresponding sections of the object model 402. Additionally, a visual representation 412 of the object model 408 will appear smoother and/or cleaner, having fewer (if any) discrepancies (e.g., discontinuities and/or repeated details). It should be noted that a low-resolution model, such as object model 408, will require significantly less memory than a corresponding high-resolution model, such as object model 402. Additionally, low-resolution models may require less processing power, and may be easier and/or faster (when compared to the high-resolution model 402), to render and/or may be easier and/or faster to display from changing perspectives and manipulate (e.g., select, drag & drop in, rotate, resize and/or move) on a visual display (e.g., a virtual reality "VR" or augmented reality "AR" display).

Figure 5:
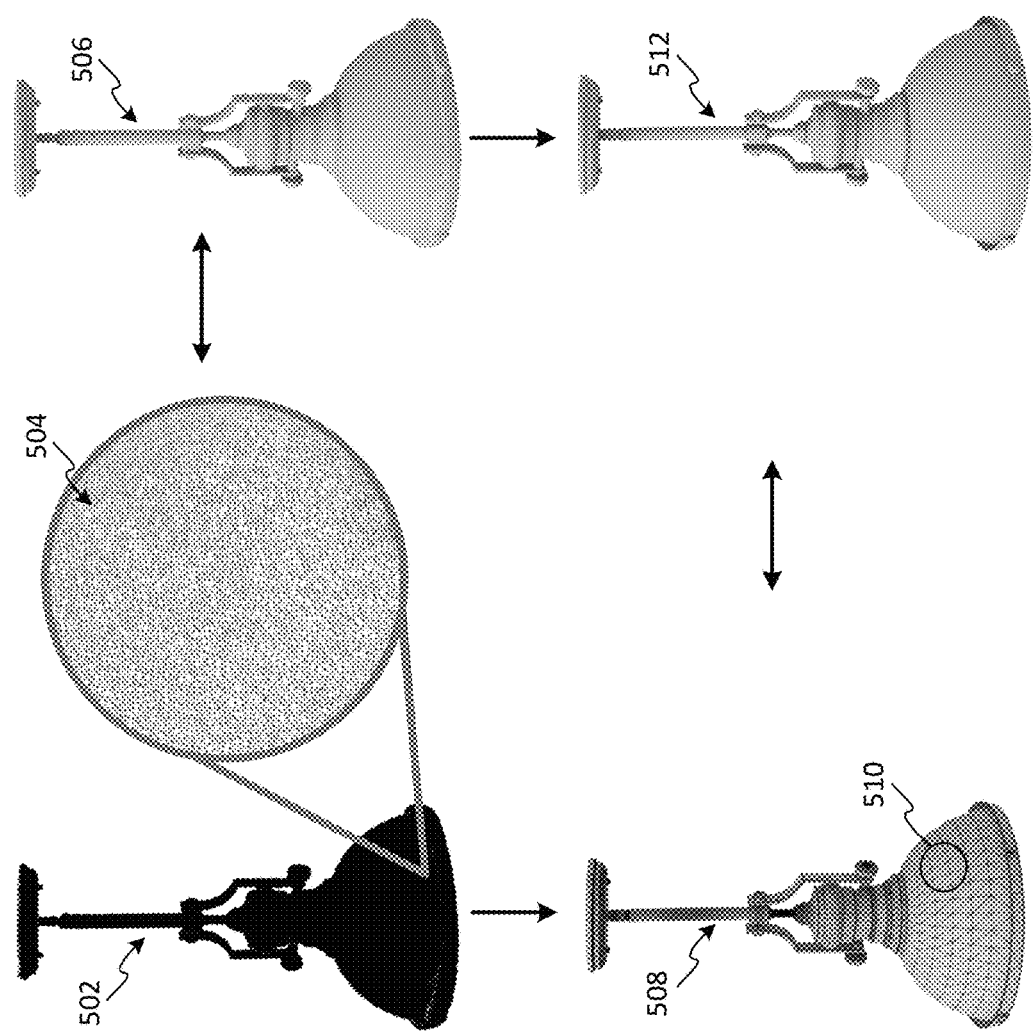
FIG. 5 depicts a second illustrative example of a relatively high resolution object model having been retopologized into a relatively low resolution object model in accordance with at least some embodiments.

FIG. 5 depicts a second illustrative example of a relatively high resolution object model having been retopologized into a relatively low resolution object model in accordance with at least some embodiments. As depicted in FIG. 5, a high-resolution object model 502 of a lamp is depicted. As depicted by the blown-up section 504, the mesh of the object model 502 may consist of a high number of polygons arranged in a somewhat random manner. Also provided is a visual representation 506 of the object model 502 which depicts a rough image of the lamp.

Similar to the example in FIG. 4, retopologization techniques described herein may be used by the system to generate a second object model 508 which includes a relatively low-resolution mesh (when compared to the high-resolution mesh 502). For example, each section 510 of the object model 508 will have fewer polygons than corresponding sections of the object model 502. Additionally, a visual representation 512 of the object model 508 will appear smoother and/or cleaner, having fewer (if any) discrepancies (e.g., discontinuities and/or repeated details).

Figure 6:
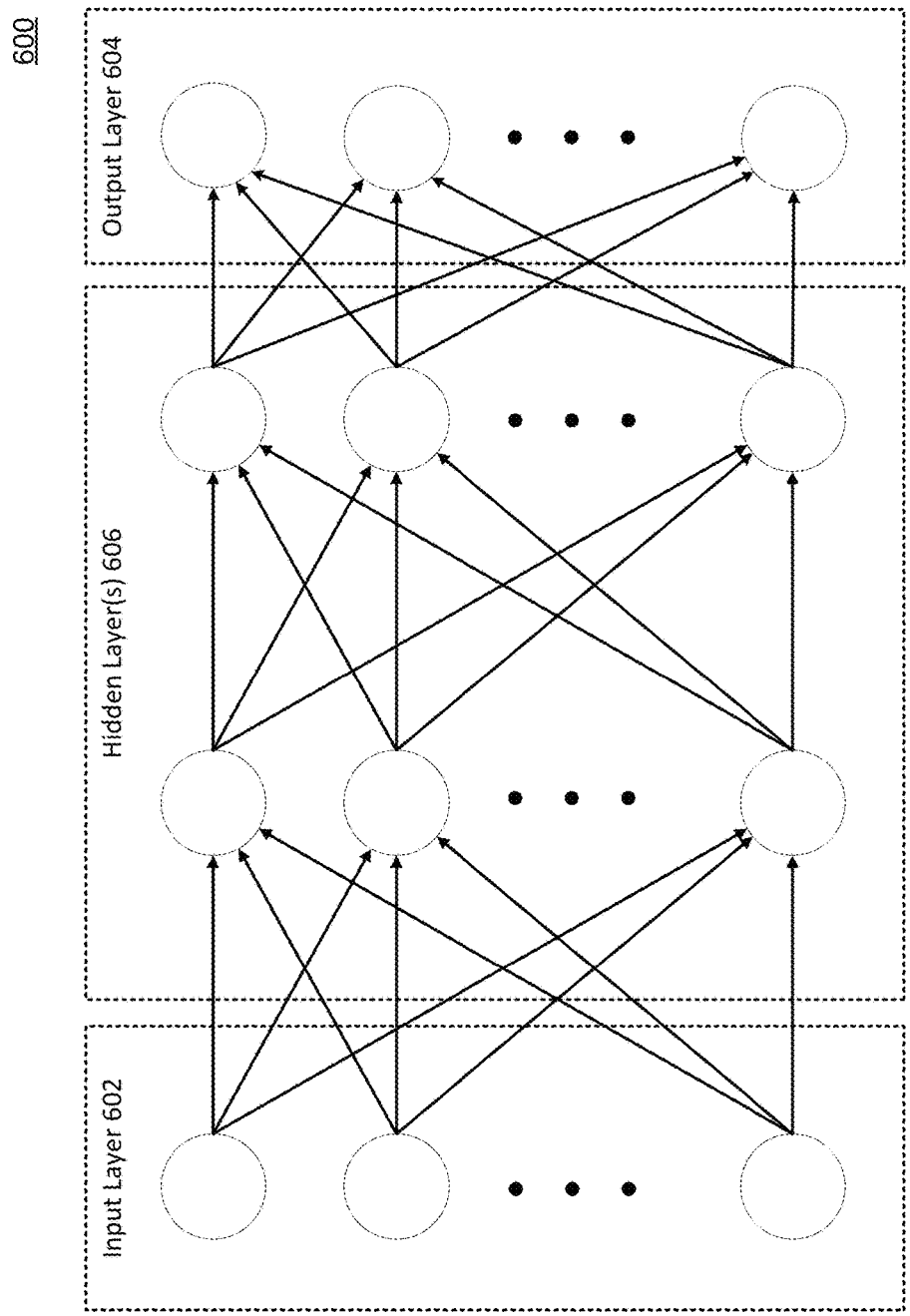
FIG. 6 depicts an illustrative example of at least one machine learning model that may be used to categorize object models and identify matching regions of object models in accordance with at least some embodiments.

FIG. 6 depicts an illustrative example of at least one machine learning model that may be used to categorize object models and identify matching regions of object models in accordance with at least some embodiments. In particular, FIG. 6 depicts an artificial neural network 600 type machine learning model. Generally, an artificial neural network represents a network of interconnected nodes, similar to a biological neural network, where knowledge about the nodes is shared across output nodes and knowledge specific to each output node is retained. Each node represents a piece of information. Knowledge can be exchanged through node-to-node interconnections and node-to-task connections. Input to the artificial neural network 600 activates a set of nodes. In turn, this set of node activates other nodes, thereby propagating knowledge about the input. At each set of nodes, transformative functions may be applied to the data. This activation process is repeated across other nodes until an output node is selected and activated.

As illustrated, the artificial neural network 600 includes a series of layers, each representing a set of nodes. On one side of the series of layers exists an input layer 602. The input layer 602 includes a set of nodes that are referred to herein as input nodes. Each of these input nodes may be mapped to a particular feature of an object model or an object model itself. In some embodiments, each "feature" may actually comprise a combination of other features. For example, a feature may comprise a number of data points, a label associated with those data points (e.g., a region label), a position of the data points with respect to the rest of the object model, or any other suitable feature.

On the other side of the series of layers is an output layer 604. The output layer 604 includes a number of output nodes. Each of the output nodes may be mapped to an object model associated with a particular category of object. In some embodiments, each output node may be mapped to a region of a number of regions associated with an object model provided as input.

One or more hidden layers 606 separates the input layer 602 and the output layer 604. The set of hidden layers 606 includes "N" number of hidden layers, where "N" is an integer greater than or equal to one. In turn, each of the hidden layers also includes a set of nodes that are referred to herein as hidden nodes.

On one side of the hidden layers 606, hidden nodes are interconnected to the input nodes. Each of the input nodes may be connected to each of the hidden nodes of the hidden layer connected to the input layer 602. On the other side of the hidden layer 606, hidden nodes are connected to the output nodes. Each of the output nodes may be connected to each of the hidden nodes of the hidden layer connected to the output layer 604. In other words, each input node connects to each hidden node in the hidden layer closest to the input layer 602 and each output node connects to each hidden node in the hidden layer closest to the output layer 604. The input nodes are not directly interconnected to the output nodes. If multiple hidden layers exist, the input nodes are interconnected to hidden nodes of the closest hidden layer only. In turn, these hidden nodes are interconnected to the hidden nodes of the next hidden layer and so on and so forth.

An interconnection may represent a piece of information learned about the two interconnected nodes. In comparison, a connection between a hidden node and an output node may represent a piece of information learned that is specific to the output node. The interconnection may be assigned a numeric weight that can be tuned (e.g., based on a training dataset), rendering the artificial neural network 600 adaptive to inputs and capable of learning.

Generally, the hidden layer 606 allows knowledge about the input nodes of the input layer 602 to be shared amongst the output nodes of the output layer 604. To do so, an activation function $f$ is applied to the input nodes through the hidden layer 606. In an example, the activation function $f$ may be non-linear. Different non-linear activation functions $f$ are available including, for instance, a rectifier function $f(x)=\max(0, x)$. In an example, a particular non-linear activation function $f$ is selected based on cross-validation. For example, given known example pairs (x, y), where $x \in X$ and $y \in Y$, a function $f: X \rightarrow Y$ is selected when such a function results in the best matches (e.g., the best representations of actual correlation data).

The artificial neural network 600 may also use one or more cost functions to find an optimal solution (e.g., an optimal activation function). The optimal solution represents the situation where no solution has a cost less than the cost of the optimal solution. In an example, the cost function includes a mean-squared error function that minimizes the average squared error between an output $f(x)$ and a target value y over the example pairs (x, y). In some embodiments, a backpropagation algorithm that uses gradient descent to minimize the cost function may be used to train the artificial neural network 600. Using a backpropagation algorithm, the output values are compared with a correct answer to compute the value of some predefined error-function. By various techniques, the error is then fed back through the network. Using this information, the algorithm may adjust the weights of each connection in order to reduce the value of the error function by some small amount. In some embodiments, the artificial neural network 600 may be an autoencoder neural network, in which both inputs and outputs are provided to the artificial neural network during training and the autoencoder learns to reconstruct its inputs.

In the depicted artificial neural network 600, a forecasting model may be generated such that the hidden layer 606 retains information (e.g., specific variable values and/or transformative functions) for a set of input values and output values used to train the artificial neural network 600. This retained information may be applied to an input object model in order to identify a likely category and corresponding regions for the object model. In some embodiments, the artificial neural network 600 may be trained on object models for a large number of objects so that it may be used to categorize and segment similar objects. For example, an artificial neural network 600 may be used to generate a forecasting model using inputs that include a plurality of object models and outputs that include a categorization and a set of regions for each object model. In this example, the resulting forecasting model may be applied to particular object models in order to generate a set of regions that may be used to match edge data to those objects.

By way of illustration, a neural network as depicted in FIG. 6 may be trained using raw (either high-resolution or low-resolution) object models for a number of items as inputs. Each of the output nodes in this example may represent object model data that has been assigned to particular regions for a particular category. When a new object model is presented as input to the trained neural network, the neural network will output a number of regions that each include 3D representation data from a particular portion of the presented object model.

Figure 7:
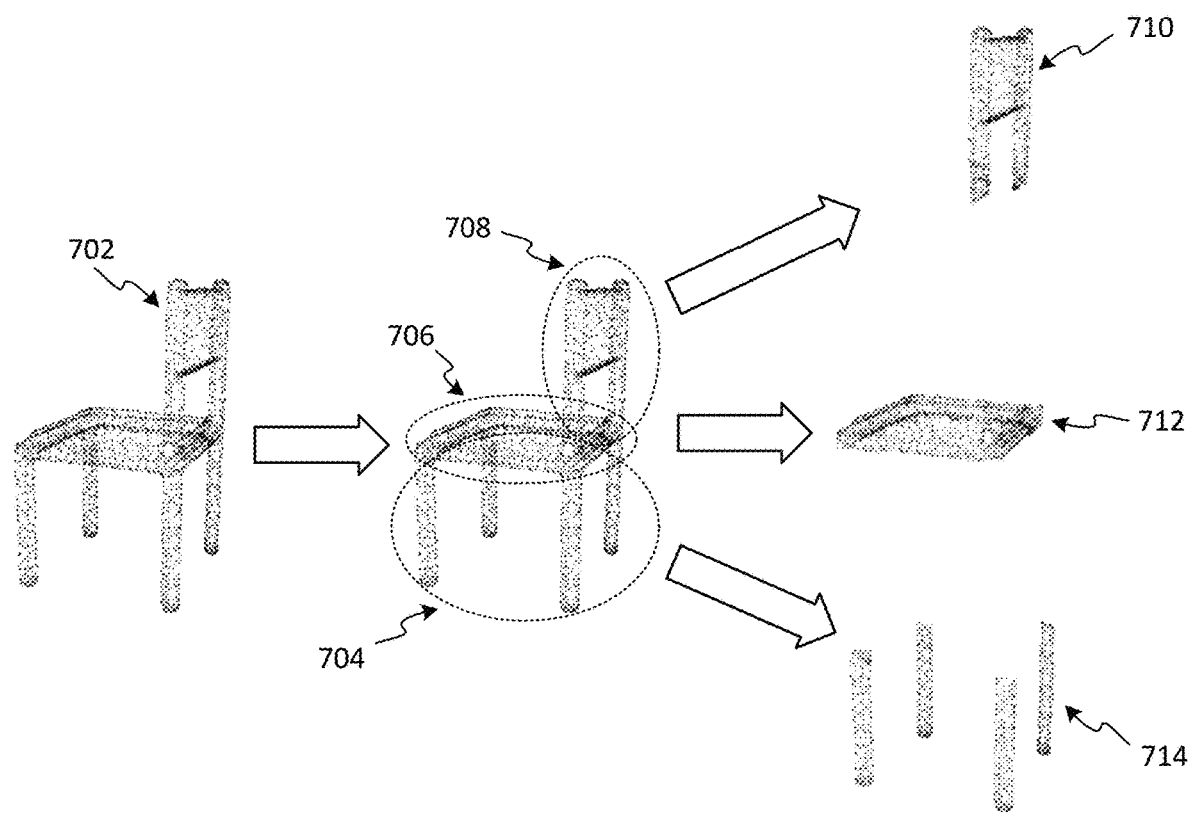
FIG. 7 depicts an illustrative example of a process by which an object model may be segmented in accordance with at least some embodiments.

FIG. 7 depicts an illustrative example of a process by which an object model may be segmented in accordance with at least some embodiments. In FIG. 7, an object model 702 is depicted in relation to a chair. Although the object model 702 appears as a point cloud, it should be noted that this is for illustrative purposes only and an object model may include any suitable 3D representation of an object. For example, instead of point cloud data, the object model 702 could be a 3D mesh. It should be noted that one skilled in the art would recognize a number of alternative object model types, each of which would be applicable to the processes described in this disclosure. It should be noted that in some embodiments, a machine learning model (e.g., the neural network model described in FIG. 6) may be trained using object models as inputs and 3D data assigned to separate regions of those object models as outputs. In these embodiments, there may be no need to categorize objects, as the machine learning model may be taught to segment an object model automatically.

In some embodiments of the process depicted, object model 702 may first be categorized or otherwise classified. For example, the system may use one or more machine learning techniques to determine that the object model 702 most likely pertains to a chair category of object. Once the system has identified that the object is most likely a chair category of object, the system may identify regions associated with other chair category objects. For example, a number of object models may be retained by the system in an object model database (e.g., object model data 222). In this example, the object models may each include labeled region data. In some cases, region data may be labeled by an artist or other user. In some cases, region data may be labeled by the system during a prior execution of the processes described herein. The object model data may include some combination of region data labeled by a user and region data labeled by the system. The system may identify a number of object models which are also categorized as a chair object and may identify typical regions associated with a chair object as well as positional information associated with those regions. Additionally, the system may determine that some regions may be necessary regions for a particular object category, while some regions may be optional regions for a category.

By way of illustration, the system, in the current example, may determine that object models belonging to the chair category typically include a support region 704, a seat region 706, a back region 708, and one or two arm regions. The system may then determine that several of the object models in the object model data do not include arm regions. The system may then conclude that arm regions are optional for the chair category of object.

Once a number of regions and their corresponding positional information has been identified, the system may segment the object model 702 by assigning 3D data from the object model 702 to each of the regions. For example, some first portion of 3D data 710 may be assigned to a back region 708, a second portion of 3D data 712 may be assigned to a seat region 706, and a third portion of 3D data 714 may be assigned to a support region 704. In some embodiments, one or more of the region data 710, 712, and 714 may include some overlap of 3D data. For example, some 3D data may be assigned to both the first portion of data 710 and the second portion of data 712. In some embodiments, 3D data from the object model 702 may be assigned to regions such that there is no overlap in data between the different portions. The system may ensure that all of the 3D data in the object model 702 is assigned to at least one region.

Figure 8:
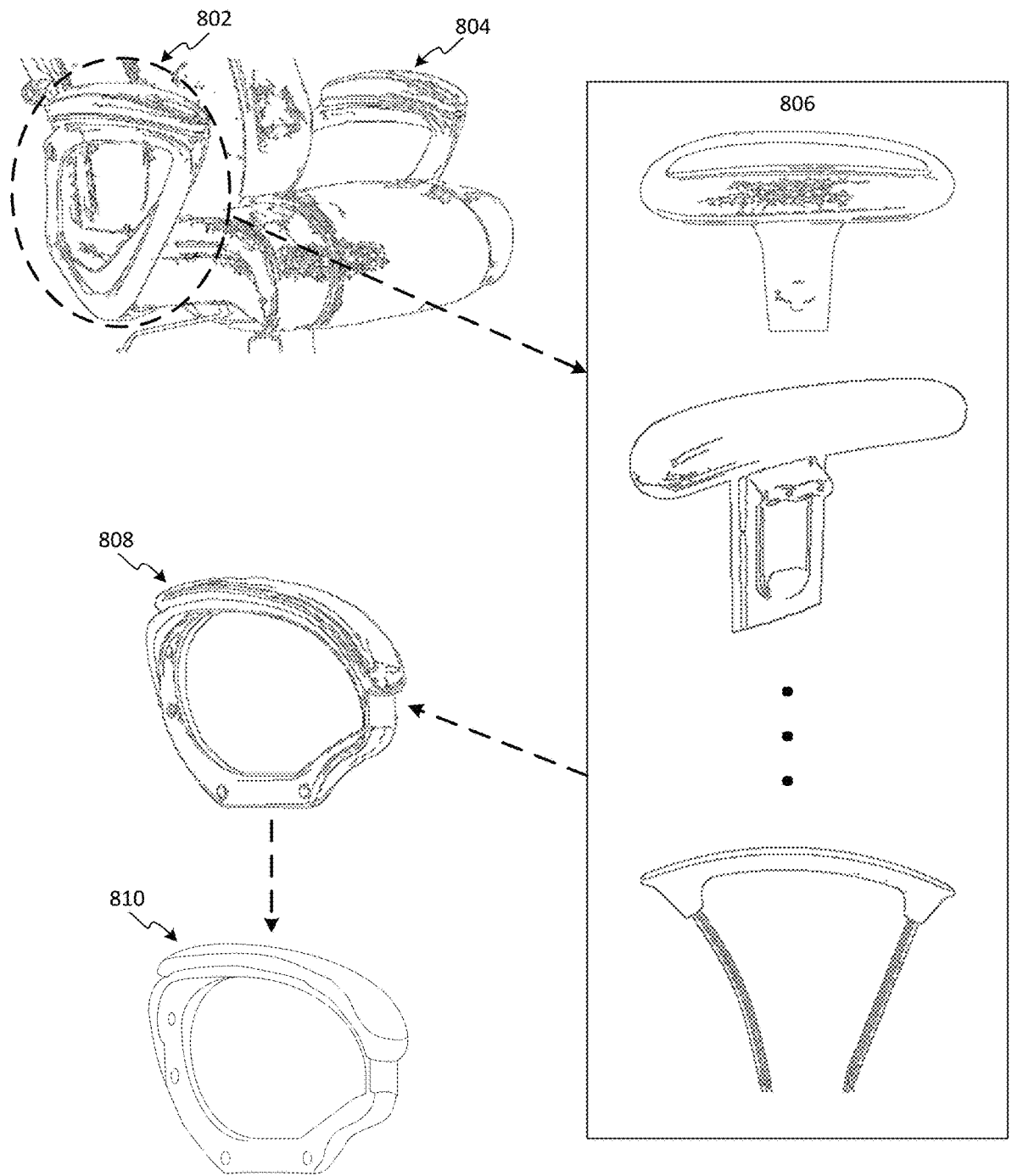
FIG. 8 depicts an illustrative example of a process for identifying a set of edges for each portion of 3D data in a region in accordance with at least some embodiments.

FIG. 8 depicts an illustrative example of a process for identifying a set of edges for each portion of 3D data in a region in accordance with at least some embodiments. In FIG. 8, a portion of data 802 of object model 804 has been assigned to a region. As described above, the region (e.g., an armrest region) may be associated with a particular category of object (e.g., a chair object). An example segmenting process is described in greater detail above with respect to FIG. 7, which may be used to generate portions of 3D data assigned to one or more regions.

In the illustrated process, the system may, upon identifying a portion of 3D data 802 for a region, match that 3D data 802 to 3D data of corresponding regions for a number of other objects. In some embodiments, the system may identify 3D data in a corresponding region for each of the object models in an object model database 806 that are of the same category as the object model 804. For example, if the 3D data 802 corresponds to 3D data from an armrest region of a chair object model, then the system may compare the 3D data 802 to other 3D data from armrest regions of other chairs.

The system may, using object recognition or some other suitable technique, identify a closest matching corresponding region 808 to the region 802. In some embodiments, the system may identify some delta or mean squared error between the closest matching corresponding region 808 and the region 802. In some embodiments, if that delta is greater than some threshold value, then the system may determine that the two regions are too dissimilar. In those embodiments, the system may provide a notification that artist intervention is necessary to identify a set of edges for the region 802. If the delta is below the threshold value, then the closest matching corresponding region 808 may be selected by the system.

Once the system has identified a closest matching corresponding region 808, the system may then identify a set of edges 810 associated with that closest matching corresponding region 808. The process described with respect to FIG. 8 may be repeated any number of times until all of the regions of an object model (e.g., object model 804) have been processed so that a set of edges has been identified for that region or an indication has been received that artist intervention may be necessary for that region. Although referred to as a set of edges, it should be noted that the set of edges may also include vertices or other structures. In some embodiments, a set of edges may be maintained with respect to each closest matching corresponding region. For example, the system may maintain an object model database and a retopology database. Each portion of data stored in the object model database with respect to a particular region (and particular object model) may be mapped to a corresponding set of edges in the retopology database. Once a set of edges has been identified in the manner described, that set of edges may be conformed to the object model in accordance with techniques described in greater detail below.

Figure 9:
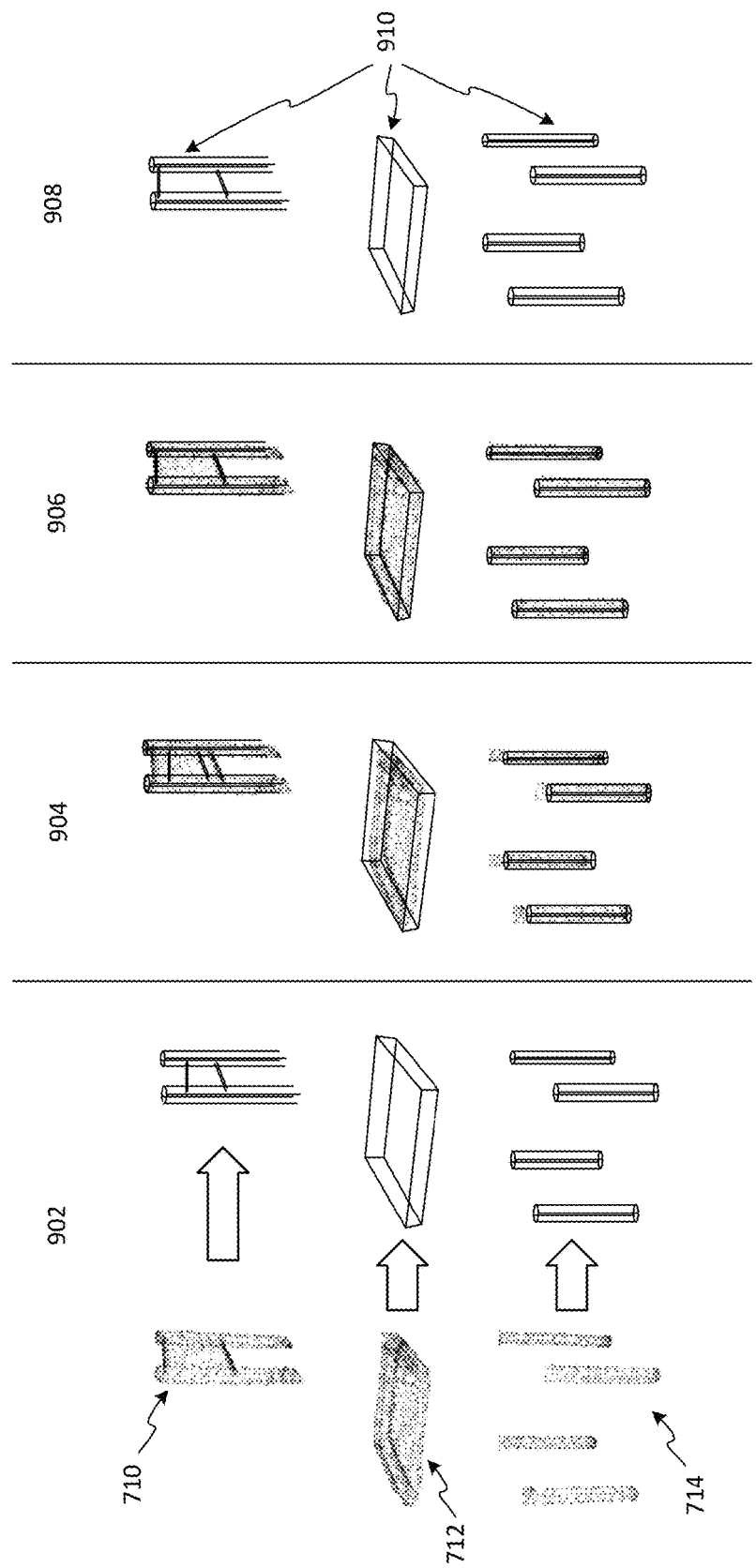
FIG. 9 depicts an illustrative example of a process for conforming one or more sets of edges to object model data in accordance with at least some embodiments.
Figure 10:
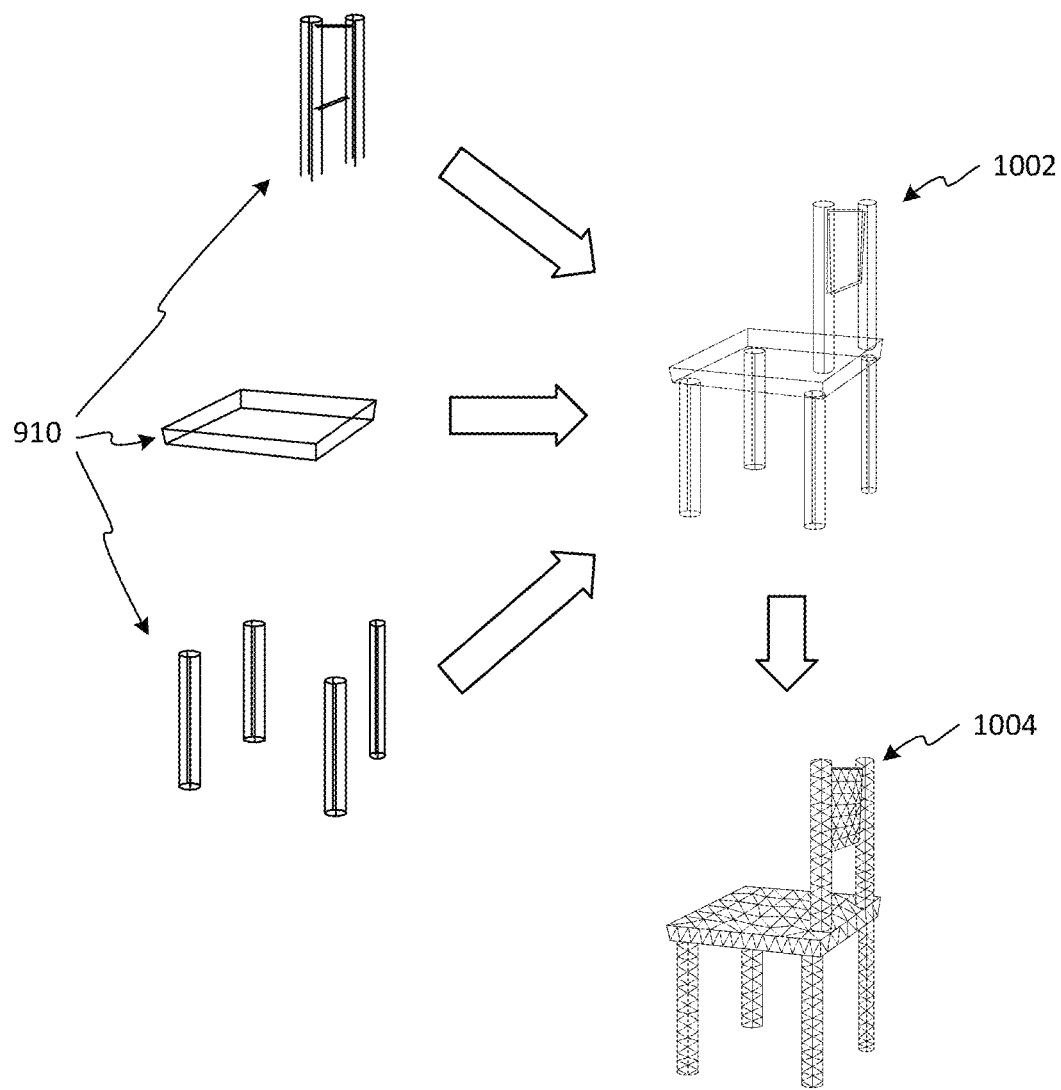
FIG. 10 depicts an illustrative example of a process for constructing a retopologized mesh from sets of edges in accordance with at least some embodiments.

FIG. 9 depicts an illustrative example of a process for conforming one or more sets of edges to object model data in accordance with at least some embodiments. In FIG. 9, several phases of the process are illustrated. In some embodiments, the process may begin upon receiving one or more portions of 3D data for an object model. By way of illustration, the process of FIG. 9 is depicted as being performed with respect to the region data 710, 712, and 714 as described with respect to FIG. 7 above. It should be noted that the process depicted in FIG. 9 and FIG. 10 are exemplary in nature and are not intended to be limiting. Some embodiments of the disclosure may use techniques that differ from those described in FIG. 9 and FIG. 10.

At 902, the system may identify a closest matching corresponding region for each of the region data (e.g., 710, 712, and 714) of an object model. The system may then identify a set of edges associated with that closest matching corresponding region. In some embodiments, this may involve the process described above with respect to FIG. 8.

Once the system has identified a set of edges for each of the region data of the object model, each set of edges may be overlaid onto its corresponding region data at 904. For example, the set of edges may be positioned so that it roughly corresponds to the bounds of the region data. It should be noted that because a closest matching corresponding region is likely not an exact match for the region data, there may be some variance of the set of edges from the bounds of the region data.

At 906, the edges in each of the set of edges may be adjusted so that they conform to the surface of the region data for the object model. For example, one or more edges may be lengthened, shortened, moved, or otherwise updated to rest upon the surface of the region data. In some embodiments, one or more vertices of the set of edges may be snapped to one or more vertices of the region data. Ideally, each set of edges should match the surface contours of the object model for the region associated with that set of edges.

Once each of the sets of edges has been adjusted to conform to its corresponding region data, the region data can be removed at 908. The resulting sets of edges 910 may then be used to construct a retopologized mesh. An example process for constructing a retopologized mesh from the sets of edges 910 is described in greater detail with respect to FIG. 10 below.

FIG. 10 depicts an illustrative example of a process for constructing a retopologized mesh from sets of edges in accordance with at least some embodiments. In FIG. 10, the system may be provided with a number of sets of edges 910 for an object model. Upon receiving these sets of edges, the system may combine them into a compiled set of edges (i.e., a cage) 1002. When compiling a cage 1002, the system may assemble each of the sets of edges in a position which corresponds to a position of its corresponding region data within the object model. Accordingly, each of the sets of edges may be positioned so that it roughly resembles the object represented by the object model.

In some embodiments, one or more edges of the sets of edges may be altered when the sets of edges are combined into the cage 1002. For example, edges that extend into the area bounded by the cage may be clipped or cut at the surface of the cage so that the cage includes only edges that correspond to the exterior of the object model.

Once a cage 1002 has been generated by combining each of the sets of edges, a retopologized object model 1004 (e.g., a 3D mesh) may be generated from the cage 1002. In some embodiments, the system may do this by generating polygons that connect one or more edges and/or vertices within the cage. For example, the system may draw one or more lines from one edge or vertex to another edge or vertex. This may be repeated until each of the shapes formed by those lines (i.e., polygons) is closed off. In some embodiments, a mesh generator application may be used to generate the retopologized object model 1004 from the cage 1002.

Figure 11:
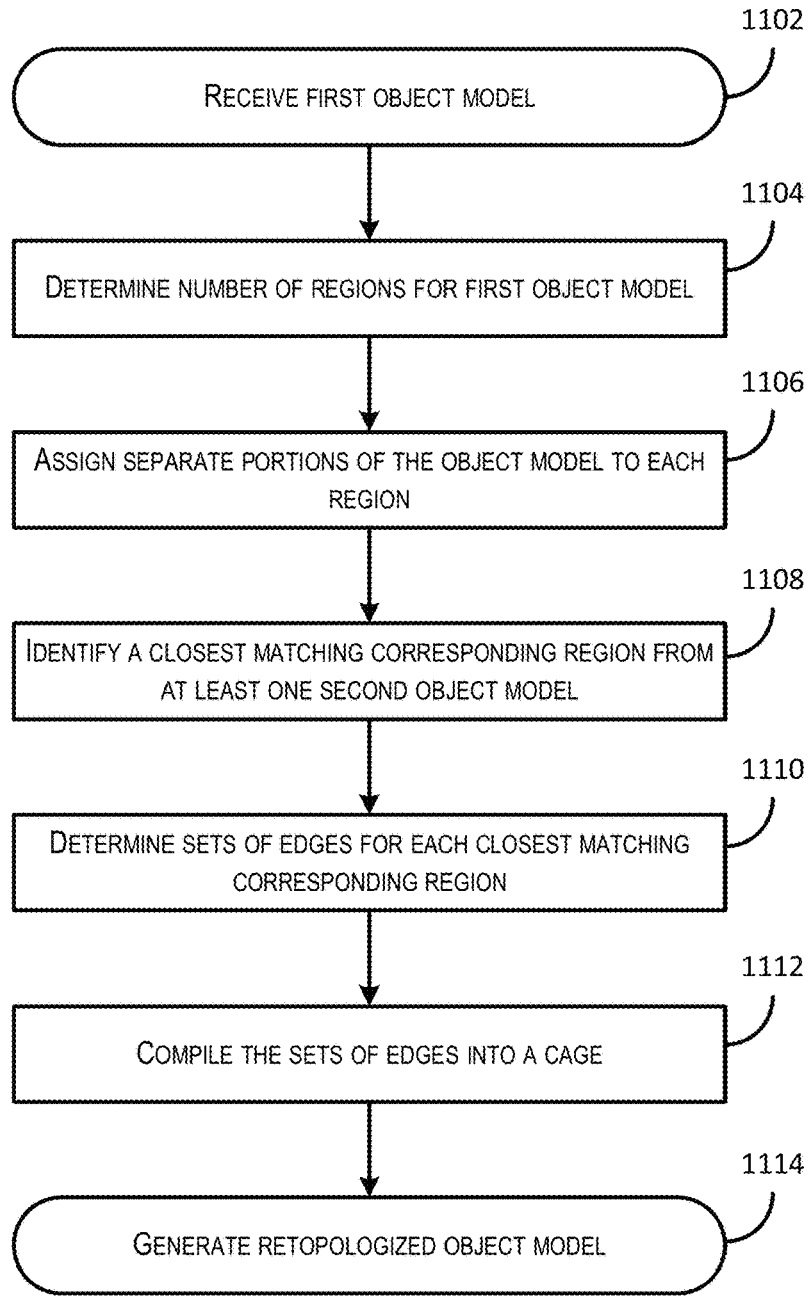
FIG. 11 depicts a flow diagram illustrating a first process for retopologizing an object model in accordance with at least some embodiments.

FIG. 11 depicts a flow diagram illustrating a first process for retopologizing an object model in accordance with at least some embodiments. In accordance with at least one embodiment, the process 1100 of FIG. 11 may be performed by at least the one or more control units 202 shown in FIG. 2.

Process 1100 may begin at 1102 when a first object model is received. An object model may be any 3D representation of an object. For example, an object model may be a 3D mesh. In some embodiments, the first object model may be a high-resolution object model which has been generated from collected point cloud data for an object. In some embodiments, the first object model may be point cloud data collected for an object.

At 1104, the process may involve determining a number of regions for the first object model. Any number of regions may be determined to be associated with the first object model. Each region may be associated with a particular feature and/or position of 3D data within the first object model. This step is described in greater detail with respect to the description of FIG. 7 above.

At 1106, the process may involve assigning separate portions of the first object model to each of the number of regions. In some embodiments, one or more machine learning models may be used to assign 3D data to different regions. For example, the system may utilize various pattern matching algorithms to identify 3D data to assign to a particular region based upon 3D data that has previously been assigned to a corresponding region in at least one second object model. This step is also described in greater detail with respect to FIG. 7 above.

At 1108, the process may involve identifying a closest matching corresponding region for each of the number of regions. Identifying the closest matching corresponding region for a particular region may involve comparing the 3D data of that region to 3D data for a plurality of corresponding regions of object models of a similar type. This step is described in greater detail with respect to FIG. 8 above.

At 1110, the process may involve determining sets of edges for each of the closest matching corresponding regions. In some embodiments, each object model stored in an object model database may be associated with a counterpart set of edges for that object model in a separate database (e.g., retopology database 224 of FIG. 2). This step is also described in greater detail with respect to FIG. 8 above.

At 1112, the process may involve compiling the sets of edges into a cage. This step is described in greater detail with respect to FIG. 10 above. In some embodiments, the sets of edges identified in relation to the regions of the first object model may be conformed to those regions of the first object model. This step is described in greater detail with respect to FIG. 9 above.

At 1114, the process may involve generating a retopologized object model. This may involve generating a number of polygons between various edges and/or vertices of the cage. In some embodiments, this may involve creating lines between various edges and vertices of the cage. In some cases, each polygon may be bounded by one or more of the identified edges that make up the cage. For example, one or more sides of a polygons may be defined by an edge. This step is also described in greater detail with respect to FIG. 10 above.

Figure 12:
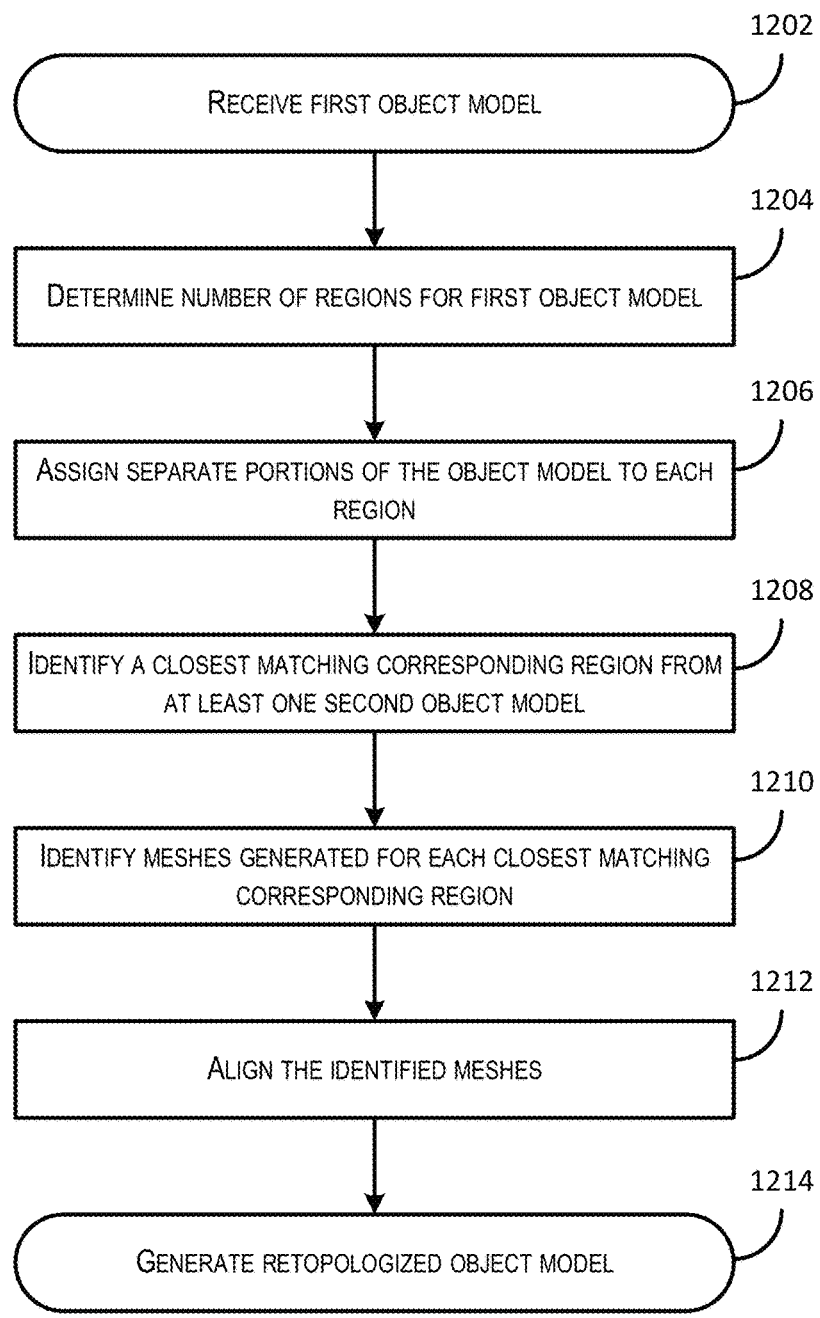
FIG. 12 depicts a flow diagram illustrating a second process for retopologizing an object model in accordance with at least some embodiments.

FIG. 12 depicts a flow diagram illustrating a second process for retopologizing an object model in accordance with at least some embodiments. In accordance with at least one embodiment, the process 1200 of FIG. 12 may be performed by at least the one or more control units 202 shown in FIG. 2.

Process 1200 may begin at 1202 when a first object model is received. An object model may be any 3D representation of an object. For example, an object model may be a 3D mesh. In some embodiments, the first object model may be a high-resolution object model which has been generated from collected point cloud data for an object. In some embodiments, the first object model may be point cloud data collected for an object.

At 1204, the process may involve determining a number of regions for the first object model. Any number of regions may be determined to be associated with the first object model. Each region may be associated with a particular feature and/or position of 3D data within the first object model. This step is described in greater detail with respect to the description of FIG. 7 above.

At 1206, the process may involve assigning separate portions of the first object model to each of the number of regions. In some embodiments, one or more machine learning models may be used to assign 3D data to different regions. For example, the system may utilize various pattern matching algorithms to identify 3D data to assign to a particular region based upon 3D data that has previously been assigned to a corresponding region in at least one second object model. This step is also described in greater detail with respect to FIG. 7 above.

At 1208, the process may involve identifying a closest matching corresponding region for each of the number of regions. Identifying the closest matching corresponding region for a particular region may involve comparing the 3D data of that region to 3D data for a plurality of corresponding regions of object models of a similar type. This step is described in greater detail with respect to FIG. 8 above.

At 1210, the process may involve identifying meshes that have been generated for each of the closest matching corresponding regions. The identified meshes may have been generated manually (e.g., by an artist), automatically (e.g., using the system described herein) or some combination of the manual and automatic mesh generation. In some embodiments, the system may maintain a database of mesh information in which each region of an object model of an object model database can be mapped to a mesh for that region in the database of mesh information. In some embodiments, several different meshes may be associated with a single object model in that each mesh pertains to a different region of that object model.

At 1212, the process may involve aligning each of the meshes identified at 1210 to their corresponding regions. In some embodiments, this may involve repositioning the mesh so that it most closely fits the corresponding region of the object model. The identified mesh, or portion thereof, may then be stretched or shortened to match the surface of the corresponding region of the object model. In some embodiments, vertices of the mesh may be snapped to the surface of the corresponding region. The identified mesh may be considered to be aligned once the mesh matches the surface of the corresponding region. In some embodiments, the identified mesh may be considered aligned upon determining that some degree of error between the mesh and the surface of the corresponding region is below some acceptable error threshold.

At 1214, the process may involve generating a retopologized object model. In some embodiments, this may involve combining each of the aligned meshes in their respective positions. In some embodiments, overlaps between the meshes may be removed. For example, polygons from a first mesh that overlap with polygons from a second mesh may be removed or resized in order to eliminate the overlap. The overlap may be eliminated, in some embodiments, by applying a boolean mesh union function to the aligned mesh data. The invention, however, is not limited to this technique for eliminating overlap inasmuch as other techniques can be applied to eliminate the overlap without creating any significant or noticeable discrepancies in the resulting mesh.

Embodiments of the disclosure provide for a number of technical advantages over conventional systems. In particular, the use of high-resolution object models often requires a much larger amount of memory and processing power than the use of similar low-resolution object models. Additionally, high-resolution object models often include a number of discrepancies. Thus, it is at least advantageous, and often necessary, to generate a low-resolution object model that corresponds to any high-resolution object model for use in applications. However, retopologizing object models from a high-resolution to a low-resolution object model typically requires that an artist or other user identify various edges of the object models. High-resolution object models, and especially those high-resolution object models which are generated from point cloud data obtained for an object, often include a number of discrepancies. However, conventional computing systems are unable to determine whether any particular feature is a necessary feature of the object model or alternatively a discrepancy. This typically requires subjective analysis only performable by a human actor. However, embodiments of the disclosure enable computing systems to perform a retopology process in a manner that is fully automatic (i.e., entirely without user interaction) or partially or mostly automatic (i.e., with some or minimal user interaction). This is accomplished in the current disclosure by leveraging a large database of object models for which artists have already manually generated edges. By identifying a closest match for each region, determining a set a edges for that match, and by conforming that set of edges to the object model data for that region, embodiments of the disclosure are able to simulate results that might be generated by a human actor, but without the involvement of that human actor or with minimal involvement of that human actor. It should be noted that retopologization of object models is a very time-consuming process that can take up to several hours per object model. Accordingly, embodiments of the disclosure provide significant increases in efficiency, both for the underlying system (in quickly generating a library of low resolution object models) and for the user (in freeing up a large amount of that user's time).

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of retopologizing an object model comprising:
    maintaining a plurality of retopologized object models, each respective retopologized model of the retopologized object models associated with a respective mesh data, each respective mesh data composed of a plurality of regions which make up the respective retopologized model;
    receiving a first object model comprising 3D data associated with an object;
    segmenting the first object model into the plurality of regions by assigning, to each of the plurality of regions, separate portions of the 3D data of the first object model;
    identifying, for each of the plurality of regions, a closest matching corresponding region from the plurality of regions which make up at least one second object model of the retopologized object models;
    determining, for each closest matching corresponding region, mesh data associated with that closest matching corresponding region; and
    generating, from the mesh data for each closest matching corresponding region, a retopologized object model by combining the mesh data determined for each closest matching corresponding region.

2. The method of claim 1, wherein the first object model is a high-resolution object model, and wherein the retopologized object model is a low-resolution object model.

3. The method of claim 1, wherein the mesh data associated with that closest matching corresponding region comprises a set of edges associated with the closest matching corresponding region from the plurality of regions which make up the at least one second object model.

4. The method of claim 1, wherein the plurality of retopologized object models are maintained for an object category, the method further comprising identifying the object category as being associated with the object, wherein the plurality of regions are determined based on the object category.

5. The method of claim 4, wherein the category is identified using one or more machine learning techniques.

6. The method of claim 1, wherein the plurality of retopologized object models are stored in an object model database.

7. The method of claim 6, wherein the mesh data associated with the closest matching corresponding region comprises a set of edges associated with the closest matching corresponding region from the plurality of regions which make up the at least one second object model, and wherein the sets of edges are stored in a separate database in relation to the plurality of retopologized object models stored in the object model database.

8. A computing system comprising:
    a processor; and
    a memory including instructions that, when executed with the processor, cause the computing system to, at least:
    maintain a plurality of retopologized object models;
    maintain a plurality of mesh data corresponding to the plurality of retopologized object models, each respective mesh data of the plurality of mesh data composed of a plurality of regions which make up a respective retopologized model;
    receive a first object model associated with an object;

assign, to each of the plurality of regions, separate portions of the first object model;
identify, for each of the plurality of regions, a closest matching corresponding region from the plurality of regions which make up at least one second object model of the plurality of retopologized object models;
determine, for each closest matching corresponding region, mesh data associated with that closest matching corresponding region; and
generate, from the mesh data for each closest matching corresponding region, a retopologized object model by combining the mesh data determined for each closest matching corresponding region.

9. The computing system of claim 8, wherein the mesh data associated with the closest matching corresponding region comprises a set of edges associated with the closest matching corresponding region from the plurality of regions which make up the at least one second object model, and wherein the set of edges has been generated by an artist or other user of the system.

10. The computing system of claim 8, wherein the first object model is segmented into each of the plurality of regions using a machine learning technique.

11. The computing system of claim 8, wherein the mesh data include a set of edges and wherein the instructions further cause the computing system to conform each of the sets of edges to the first object model.

12. The computing system of claim 11, wherein conforming each of the sets of edges to the first object model comprises snapping one or more vertices of the sets of edges to one or more vertices of the first object model.

13. The computing system of claim 8, wherein the mesh data includes edges that correspond to the exterior of the first object model.

14. The computing system of claim 8, wherein the first object model is a high-resolution mesh generated from point cloud data collected for the object.

* * * * *